US011482753B2

(12) United States Patent
Pedersen (10) Patent No.: US 11,482,753 B2
(45) Date of Patent: Oct. 25, 2022

(54) FIRE-RESISTANT ENERGY STORAGE DEVICES AND ASSOCIATED SYSTEMS AND METHODS

(71) Applicant: MAERSK DRILLING A/S, Kgs. Lyngby (DK)

(72) Inventor: John Røn Pedersen, Frederikssund (DK)

(73) Assignee: MAERSK DRILLING A/S, Kgs. Lyngby (DK)

( * ) Notice: Subject to any disclaimer, the term of this patent is extended or adjusted under 35 U.S.C. 154(b) by 233 days.

(21) Appl. No.: 16/643,723

(22) PCT Filed: Sep. 3, 2018

(86) PCT No.: PCT/DK2018/000085
§ 371 (c)(1),
(2) Date: Mar. 2, 2020

(87) PCT Pub. No.: WO2019/042505
PCT Pub. Date: Mar. 7, 2019

(65) Prior Publication Data
US 2020/0220135 A1    Jul. 9, 2020

(51) Int. Cl.
*H02J 3/30* (2006.01)
*H02J 3/32* (2006.01)
(Continued)

(52) U.S. Cl.
CPC ....... *H01M 50/24* (2021.01); *H01M 10/0525* (2013.01); *H01M 10/613* (2015.04);
(Continued)

(58) Field of Classification Search
None
See application file for complete search history.

(56) References Cited

U.S. PATENT DOCUMENTS 10,424,821 B2    9/2019  Iyengar et al.
2005/0095471 A1*  5/2005 Winstead .......... H01M 8/04626
429/430
(Continued)

FOREIGN PATENT DOCUMENTS

CN    205810892 U    12/2016
CN    106505689 A     3/2017
(Continued)

OTHER PUBLICATIONS

International Patent Application No. PCT/DK2018/000085, International Search Report and Written Opinion dated Nov. 13, 2018, 11 pgs.
(Continued)

*Primary Examiner* — Christopher P Domone
(74) *Attorney, Agent, or Firm* — Lathrop GPM LLP (57) ABSTRACT

A fire-resistant energy storage device includes a fire-resistant chassis, one or more energy storage elements housed in the fire-resistant chassis, and a heat exchanger configured to (a) cool the one or more energy storage elements and (b) protect the one or more energy storage elements from a fire external to the fire-resistant energy storage device. An energy storage assembly includes (a) a plurality of physically separate fire-resistant energy storage devices, each of the plurality of physically separate fire-resistant energy storage devices being configured to protect one or more energy storage elements of the fire-resistant energy storage device from a fire external to the fire-resistant energy storage device, and (b) at least one power converter configured to electrically interface the plurality of physically separate fire-resistant energy storage devices with an electric power buss.

19 Claims, 8 Drawing Sheets

(51) Int. Cl.
*H02J 7/00* (2006.01)
*H01M 10/613* (2014.01)
*H01M 10/0525* (2010.01)
*H01M 10/6567* (2014.01)
*H01M 10/627* (2014.01)
*H01M 10/6552* (2014.01)
*H01M 50/24* (2021.01)
*H01M 50/20* (2021.01)

(52) U.S. Cl.
CPC ..... *H01M 10/627* (2015.04); *H01M 10/6552* (2015.04); *H01M 10/6567* (2015.04); *H01M 50/20* (2021.01); *H02J 3/30* (2013.01); *H02J 3/32* (2013.01); *H02J 7/0042* (2013.01); *H01M 2220/10* (2013.01)

(56) References Cited

U.S. PATENT DOCUMENTS

| | | | |
|---|---|---|---|
| 2012/0197449 A1* | 8/2012 | Sanders | G06F 1/26 700/291 |
| 2012/0242206 A1* | 9/2012 | Gasser | H05K 7/20609 312/236 |
| 2013/0063241 A1 | 3/2013 | Simon | |
| 2013/0134928 A1 | 5/2013 | Uchihashi et al. | |
| 2013/0209838 A1 | 8/2013 | Manna et al. | |
| 2014/0012446 A1 | 1/2014 | Kumar et al. | |
| 2015/0221914 A1 | 8/2015 | Page et al. | |
| 2016/0185434 A1* | 6/2016 | Hirst | B63H 25/42 60/263 |
| 2017/0352935 A1* | 12/2017 | Perdu | H01M 50/116 |

FOREIGN PATENT DOCUMENTS

| | | |
|---|---|---|
| CN | 206179920 U | 5/2017 |
| DE | 201 16 667 U1 | 2/2003 |
| EP | 2 497 389 A1 | 9/2012 |
| EP | 3607608 A1 | 2/2020 |
| JP | 2012 227120 A | 11/2012 |
| JP | 2013 171673 A | 9/2013 |
| KR | 20160140478 A | 12/2016 |
| WO | WO 2013/018872 A1 | 2/2013 |
| WO | WO2016096974 A1 | 6/2016 |
| WO | WO 2016 131460 A1 | 8/2016 |

OTHER PUBLICATIONS

Danish Patent Application No. PA201700492; Search Report completed Oct. 31, 2018; 4 pgs.
European Patent Application No. 18786210.7 Communication pursuant to Article 94(3) EPC dated Oct. 1, 2021, 6 pages.

* cited by examiner

FIRE-RESISTANT ENERGY STORAGE DEVICES AND ASSOCIATED SYSTEMS AND METHODS

CROSS-REFERENCE TO RELATED APPLICATIONS

This application is a 35 U.S.C. § 371 filing of International Application No. PCT/DK2018/000085 filed Sep. 3, 2018, which claims the benefit of priority to Great Britain Application No. GB1714071.6, filed Sep. 1, 2017, and Danish Patent Application No. PA201700492 filed Sep. 10, 2017, each of which is incorporated herein by reference in its entirety.

FIELD

The present embodiments relate to fire-resistant energy storage devices and associated systems and methods for use in a variety of applications, such as in drilling rig applications and in ship applications.

BACKGROUND

A drilling rig requires significant electric power, especially during oil and gas drilling activity. For example, electric power is used on a drilling rig to power equipment such as drawworks, winches, and high pressure units (HPUs), for hydraulic based hoisting on a drill floor. Electric power is also required to supply numerous other electric loads like electric thrusters, mud pumps, top drives, rotary tables, and dynamic braking systems, on a drilling rig. Drilling rigs often include oversized combustion generators to accommodate "peak" power requirements of electric loads coupled to an energy generation and distribution system, referred to herein as an "electric power system," of the drilling rig. Conventionally, the number of typically active combustion generators of the electric power system is more than the number of combustion generators required by the application's load, to achieve redundancy and to meet peak power demand.

Drilling rigs may include dynamic positioning systems including electrically driven propellers, commonly referred to as electric thrusters, which are powered by the drilling rig's electric power system. The dynamic positioning systems keep a desired drilling rig position in the sea during oil and gas drilling operations. For certain high risk operations, it is vital that a desired position of the drilling rig and essential drilling rig operations be maintained to prevent an increased risk of oil pollution, loss of life, and/or loss of well. Electric power system integrity and failure safe operation are therefore of particular importance. Drilling rigs that require dynamic positioning are often classified in different classes such as DP2 (dynamic positioning 2) or DP3 (dynamic positioning 3). To ensure that a single component malfunction does not lead to a complete electric power system blackout on a drilling rig, the electric power system is often split into several electrically interconnectable power system sections, for example in 2, 3, 4, 5, 6, 7, 8 or even more separate power sections. These interconnectable power system sections may all be electrically connected, e.g. in a so-called ring configuration, under normal system operating conditions.

However, during certain high risk operating modes or when fault is present in a section, the interconnectable power system sections may be electrically isolated from each other by opening connections made by electric cables via buss-tie circuit breakers. Each power system section is often isolated by fireproof and watertight separations. Such fireproof separations typically comply with International Maritime Organization (IMO) Class A-60 standard, which specifies, in part, that average temperature on a side of the separation not exposed to fire will not rise by more than 140 degree Celsius from the original temperature, and that the temperature at any point on the unexposed side will not rise by more than 180 degrees Celsius from the original temperature, when heat/fire of prescribed intensity is applied to an exposed side of the separation for 60 minutes. One or more combustion generators are active in each of the power system sections to supply electric power to connected alternating current (AC) bus loads such as electric thrusters. Operating such energy generation with interconnected power system sections, i.e. with connected buss-tie circuit breakers, is generally not possible shortly after a system fault, such as a short circuit or combustion generator failure causing a total blackout of the electric power system. The blackout may cause risk of loss of drilling rig position.

In some applications, each power system section includes an AC bus subsection divided into first and second segments which are electrically connected through a pair of series-connected buss-tie circuit breakers housed in physically separate switchboard compartments to selectively connect and disconnect the first and second segments of the AC bus subsection. If one of the first and second switchboard compartments is rendered inoperable by a single point failure, the other switchboard compartment and its associated segment of the AC bus subsection, combustion generator, and electric thruster will be undamaged. Hence, the single point failure leads merely to the loss of a single combustion generator and a single thruster drive (and its associated thruster).

Drilling rig peak power demand occurs, for example, during "tripping" of a pipe or a drill stem in/out of a well, running and retrieving a riser, lifting operations on the drill floor, lifting operations with cranes or other hoisting equipment, etc. During normal operations, there is a base load of lighting, pumps, agitators, mixers, air compressors, etc. on the drilling rig's electric power system. This base load is, for example, 1-5 megawatts (MW). Mud pumps, top drives, and rotary tables also collectively present a load around a megawatt. Electric power demand on a drilling rig varies according to the particular well, depth of drilling, material being drilled, and equipment used for drilling operations.

During oil/gas well drilling activities on a drilling rig, the most intermittent load is often a lifting device for the drill floor (i.e., a lifting device for lifting tubulars in and out of a well center and to/into a seabed, which is also referred to as a hoisting system) such as drawworks, a winch, and a HPU for lifting cylinders. This intermittent load causes a peak power demand during the raising or lowering of the drill pipe upwardly and downwardly in the well. This peak power demand can be incurred by loads 2-3 times (or more) larger than the base loads of the other drilling rig demands. For example, during a drilling operation it may be necessary to retrieve the drill string after finishing a section of the well or to replace the drill bit. This drill string can be 10,000 feet or more. During the tripping in, and particularly when tripping out, of the hole, the driller (operator) demands extreme power consumption in power bursts as the driller raises (or lowers) the string of drill pipe. Since height of the drilling mast is limited, the operator must lift the string out in sections (typically in stands of 2 to 4 drill pipes) by lifting a section over the drill floor, stopping the lifting process, breaking out a stand, and racking back the string, and commencing lifting again. This process is reversed during the reinsertion of the drill pipe back into the hole. This process is often referred to as "tripping" in or out of the hole. In some embodiments, the intermittent peak power demand occurs, for example, when this load (e.g. 300,000 pounds or more) is applied to the electric motor or motors lifting the pipe string over and over again. The load is variable since the weight of the drill stem becomes less and less as pipe sections are removed. Another example of intermittent loads occurs when multiple machines begin operating simultaneously. Such events may be more likely in drilling rigs with advanced automation systems, so that a single actuation by the operator can coordinate several machines to begin working towards a particular operation.

To deliver such power bursts without overloading active combustion generators and without requiring an excessive number of simultaneously active combustion generators, it is advantageous to deliver power or energy for these power bursts by one or more energy storage devices. This delivery of power from energy storage devices to handle temporary increases in load is often referred to as "peak-shaving". Energy storage devices are also frequently used to provide backup power in the event of combustion generator failure. Possible energy storage devices include batteries, flywheels, supercapacitors, and a combination thereof.

SUMMARY

In an embodiment, a fire-resistant energy storage device includes a fire-resistant chassis and one or more energy storage elements housed in the fire-resistant chassis.

In an embodiment, the fire-resistant energy storage device further includes a heat exchanger configured to (a) cool the one or more energy storage elements and (b) protect the one or more energy storage elements from a fire external to the fire-resistant energy storage device.

In an embodiment, the one or more energy storage elements include at least one battery, and in certain embodiments, the at least one battery is a Lithium-ion battery.

In an embodiment, each battery includes one or more electro-chemical cells, and the fire-resistant chassis is a first enclosure surrounding the one or more electro-chemical cells of each battery.

In an embodiment, the fire-resistant chassis occupies a volume of 5 $m^3$ or less, such as 4.5 $m^3$ or less, such as 4 $m^3$ or less, such as 3.5 $m^3$ or less, such as 3 $m^3$ or less, such as 2.5 $m^3$ or less, such as 2 $m^3$ or less, such as 1.5 $m^3$ or less, such as 1 $m^3$ or less, such as 0.5 $m^3$.

In an embodiment, the fire-resistant chassis occupies a volume of 4 $m^3$ or less, such as 3.5 $m^3$ or less, such as 3 $m^3$ or less, such as 2.5 $m^3$ or less, such as 2 $m^3$ or less, such as 1.5 $m^3$ or less, such as 1 $m^3$ or less, such as 0.5 $m^3$.

In an embodiment, the one or more energy storage elements include a flywheel.

In an embodiment, the heat exchanger is a liquid-cooled heat exchanger.

In an embodiment, the heat exchanger at least partially or fully surrounds the one or more energy storage elements.

In an embodiment, the fire-resistant energy storage device complies with International Maritime Organization Class A-60 standard with respect to protecting the fire-resistant energy storage device from a fire external to the fire-resistant energy storage device.

In an embodiment, the fire-resistant energy storage device further includes thermally insulating material to protect the one or more energy storage elements from a fire external to the energy storage device.

In an embodiment, the thermally insulating material has a thickness of 300 mm or less, 200 mm or less, 100 mm or less, or 50 mm or less.

In an embodiment, the fire-resistant chassis is configured for placement in a battery housing assembly.

In an embodiment, the fire-resistant energy storage device has a physical form factor equivalent to that an industry-standard battery.

In an embodiment, an energy storage assembly includes (a) a plurality of physically separate fire-resistant energy storage devices, each of the plurality of physically separate fire-resistant energy storage devices being configured to protect one or more energy storage elements of the fire-resistant energy storage device from a fire external to the fire-resistant energy storage device, and (b) at least one power converter configured to electrically interface the plurality of physically separate fire-resistant energy storage devices with an electric power buss.

In an embodiment, the plurality of physically separate fire-resistant energy storage devices are electrically coupled together.

In an embodiment, each of the plurality of physically separate fire-resistant energy storage devices complies with International Maritime Organization Class A-60 standard with respect to protecting the fire-resistant energy storage device from a fire external to the energy storage device.

In an embodiment, each of the plurality of physically separate fire-resistant energy storage devices includes a respective heat exchanger configured to (a) cool the one or more energy storage elements of the fire-resistant energy storage device and (b) protect the one or more energy storage elements of the fire-resistant energy storage device from a fire external to the energy storage device.

In an embodiment, in each of the plurality of physically separate fire-resistant energy storage devices, the one or more energy storage elements of the fire-resistant energy storage device include a battery.

In an embodiment, each of the plurality of physically separate fire-resistant energy storage devices includes a fire-resistant chassis, and in each of the plurality of physically separate fire-resistant energy storage devices, each battery includes one or more electro-chemical cells, and the fire-resistant chassis is a first enclosure surrounding the one or more electro-chemical cells of each battery.

In an embodiment, in each of the plurality of physically separate fire-resistant energy storage devices, the fire-resistant chassis occupies a volume of 5 $m^3$ or less, such as 4.5 $m^3$ or less, such as 4 $m^3$ or less, such as 3.5 $m^3$ or less, such as 3 $m^3$ or less, such as 2.5 $m^3$ or less, such as 2 $m^3$ or less, such as 1.5 $m^3$ or less, such as 1 $m^3$ or less, such as 0.5 $m^3$.

In an embodiment, in each of the plurality of physically separate fire-resistant energy storage devices, the fire-resistant chassis occupies a volume of 4 $m^3$ or less, such as 3.5 $m^3$ or less, such as 3 $m^3$ or less, such as 2.5 $m^3$ or less, such as 2 $m^3$ or less, such as 1.5 $m^3$ or less, such as 1 $m^3$ or less, such as 0.5 $m^3$.

In an embodiment, in each of the plurality of physically separate fire-resistant energy storage devices, the one or more energy storage elements of the fire-resistant energy storage device include a flywheel.

In an embodiment, each of the plurality of physically separate fire-resistant energy storage devices houses no more than three energy storage elements.

In an embodiment, an electric power system includes a first electric power buss and an energy storage assembly. The energy storage assembly includes (a) a plurality of physically separate fire-resistant energy storage devices, wherein each of the plurality of physically separate fire-resistant energy storage devices is configured to protect one or more energy storage elements of the fire-resistant energy storage device from a fire external to the fire-resistant energy storage device, and (b) at least one power converter configured to electrically interface the plurality of physically separate fire-resistant energy storage devices with the first electric power buss.

In an embodiment, each of the plurality of physically separate fire-resistant energy storage devices complies with International Maritime Organization Class A-60 standard with respect to protecting the fire-resistant energy storage device from a fire external to the energy storage device.

In an embodiment, the electric power system further includes a controller configured to control electric power flow between the first electric power buss and the plurality of physically separate fire-resistant energy storage devices such that the plurality of physically separate fire-resistant energy storage devices collectively act as a single energy storage device electrically coupled to the first electric power buss.

In an embodiment, each of the plurality of physically separate fire-resistant energy storage devices includes a respective heat exchanger configured to (a) cool the one or more energy storage elements of the fire-resistant energy storage device and (b) protect the one or more energy storage elements of the fire-resistant energy storage device from a fire external to the energy storage device.

In an embodiment, in each of the plurality of physically separate fire-resistant energy storage devices, the one or more energy storage elements of the fire-resistant energy storage device include a battery.

In an embodiment, each of the plurality of physically separate fire-resistant energy storage devices includes a fire-resistant chassis, and in each of the plurality of physically separate fire-resistant energy storage devices, each battery includes one or more electro-chemical cells, and the fire-resistant chassis is a first enclosure surrounding the one or more electro-chemical cells of each battery.

In an embodiment, in each of the plurality of physically separate fire-resistant energy storage devices, the fire-resistant chassis occupies a volume of 5 $m^3$ or less, such as 4.5 $m^3$ or less, such as 4 $m^3$ or less, such as 3.5 $m^3$ or less, such as 3 $m^3$ or less, such as 2.5 $m^3$ or less, such as 2 $m^3$ or less, such as 1.5 $m^3$ or less, such as 1 $m^3$ or less, such as 0.5 $m^3$.

In an embodiment, in each of the plurality of physically separate fire-resistant energy storage devices, the fire-resistant chassis occupies a volume of 4 $m^3$ or less, such as 3.5 $m^3$ or less, such as 3 $m^3$ or less, such as 2.5 $m^3$ or less, such as 2 $m^3$ or less, such as 1.5 $m^3$ or less, such as 1 $m^3$ or less, such as 0.5 $m^3$.

In an embodiment, in each of the plurality of physically separate fire-resistant energy storage devices, the one or more energy storage elements of the fire-resistant energy storage device include a flywheel.

In an embodiment, the plurality physically separate fire-resistant energy storage devices are disposed on one or more shelves.

In an embodiment, the plurality physically separate fire-resistant energy storage devices are disposed outside of a fire-resistant enclosure.

In an embodiment, the first electric power buss includes a DC electric power buss, and the electric power system further includes (a) an AC electric power buss, (b) a transformer and a power converter collectively electrically coupling the AC electric power buss and the DC electric power buss and (c) at least one combustion generator electrically coupled to the AC electric power buss. The plurality of physically separate fire-resistant energy storage devices are configured to (1) store energy provided by the at least one combustion generator, and (2) deliver energy stored therein to a load of the electric power system.

In an embodiment, the first electric power bus includes an AC electric power buss, and the electric power system further includes (a) a DC electric power buss, (b) a transformer and a power converter collectively electrically coupling the AC electric power buss and the DC electric power buss, and (c) at least one combustion generator electrically coupled to the AC electric power buss. The plurality of physically separate fire-resistant energy storage devices are configured to (1) store energy provided by the at least one combustion generator, and (2) deliver energy stored therein to a load of the electric power system.

In an embodiment, the electric power system further includes an electric thruster powered by the electric power system, and the plurality of physically separate fire-resistant energy storage devices are configured to power the electric thruster in the event that the at least one combustion generator is unable to power the electric thruster.

In an embodiment, the first electric power bus includes a first AC electric power buss, and the electric power system further includes (a) a second AC electric power buss, (b) a DC electric power buss, (c) a transformer and a first power converter collectively electrically coupling the second AC electric power buss and the DC electric power buss, (d) at least one combustion generator electrically coupled to the second AC electric power buss, (e) an electric thruster electrically coupled to the first AC electric power buss, and (f) a second power converter electrically coupling the DC electric power buss and the first AC electric power buss. The plurality of physically separate fire-resistant energy storage devices are configured to (a) store energy provided by the at least one combustion generator, and (b) power the electric thruster in the event that the at least one combustion generator is unable to power the electric thruster.

DETAILED DESCRIPTION OF THE EMBODIMENTS

Figure 1:
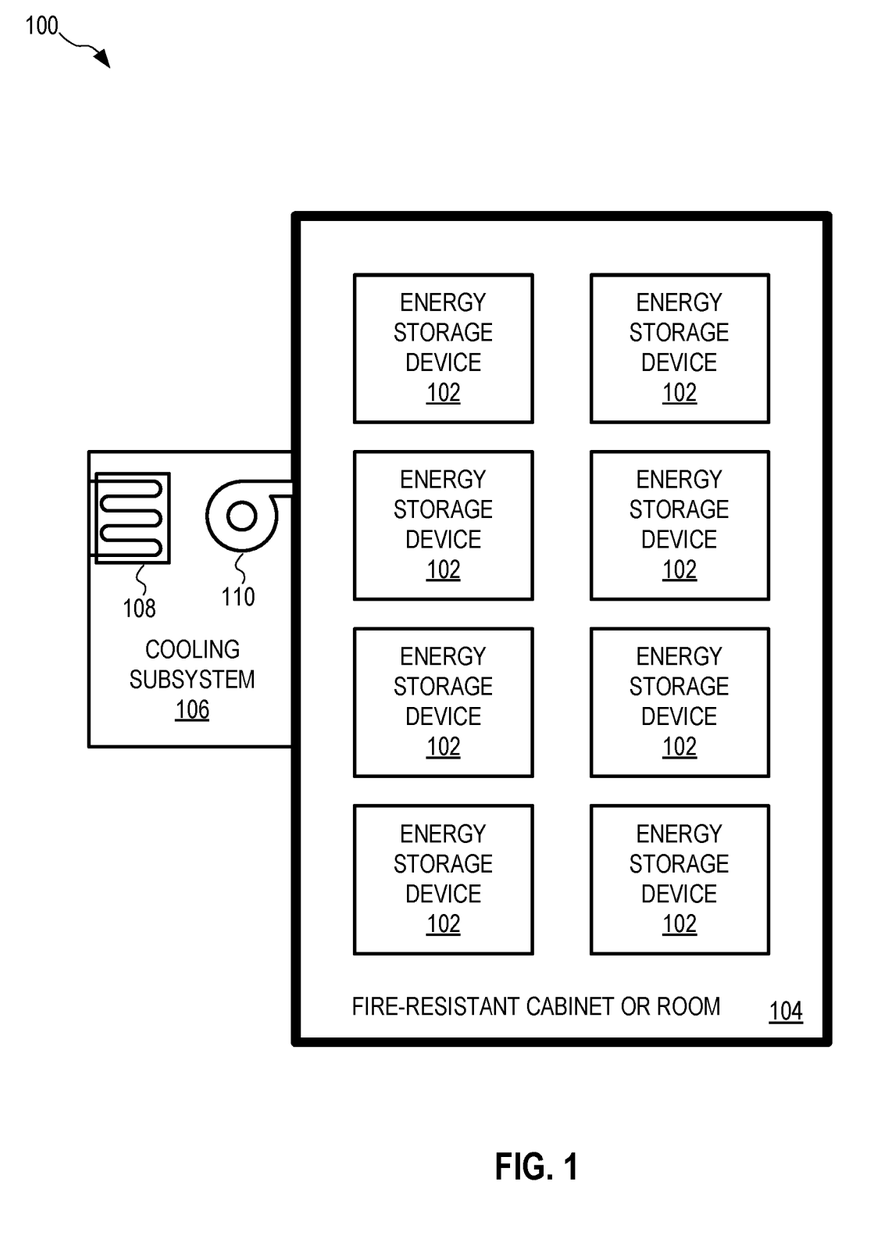
FIG. 1 illustrates an energy storage assembly including a plurality of energy storage devices disposed in a fire-resistant cabinet.

As discussed above, energy storage devices are frequently used in electric power systems, such as for peak shaving and to provide backup electric power. The energy storage devices are typically located in a fire-resistant cabinet or room, such as a cabinet or room which complies with IMO Class A-60 standard, to protect the energy storage devices from damage due to a fire external to the cabinet or room. For example, FIG. 1 illustrates an energy storage assembly 100 including a plurality of energy storage devices 102 disposed in a fire-resistant cabinet or room 104. Each energy storage device 102 includes one or more batteries, flywheels, or super capacitors (not shown). Energy storage assembly 100 further includes a cooling subsystem 106 to prevent energy storage devices 102 from overheating. Cooling subsystem 106 includes, for example, a heat exchanger 108 for absorbing heat and a blower 110 for circulating air from fire-resistant cabinet or room 104 through heat exchanger 108. Energy storage assembly 100 typically further includes cabling (not shown) and/or other electrical circuitry (not shown) for interfacing energy storage system 100 with an external system. Cabinet or room 104 typically includes one or more fire-resistant doors (not shown) enabling access to an interior of cabinet or room 104 to install, maintain, and/or replace energy storage devices 102. For example, in situations where element 104 is a fire-resistant room, the room will typically include a fire-resistant door enabling a person to enter the room to install, maintain, and/or replace energy storage devices 102.

Although energy storage assembly 100 helps protect energy storage devices 102 from fire damage, fire-resistant cabinet or room 104 requires significant space, which is undesirable in many applications, such as maritime applications where space is limited.

Additionally, fire-resistant cabinet or room 104 is relatively expensive. Furthermore, fire-resistant cabinet or room 104 may inhibit access to energy storage devices 102, thereby interfering with installation, maintenance, and/or replacement of energy storage devices 102.

Applicant has determined, however, that the above-discussed drawbacks associated with a fire-resistant cabinet or room can be at least partially overcome by use of fire-resistant energy storage devices in an energy storage assembly, thereby potentially eliminating the need for a fire-resistant cabinet or room, such as fire-resistant cabinet or room 104 of FIG. 1. Such elimination of a fire-resistant cabinet or room from an energy storage assembly may cause the energy storage assembly to be smaller, less expensive, and/or easier to access, than a conventional energy storage assembly including energy storage devices disposed in a fire-resistant cabinet or room.

Figure 2:
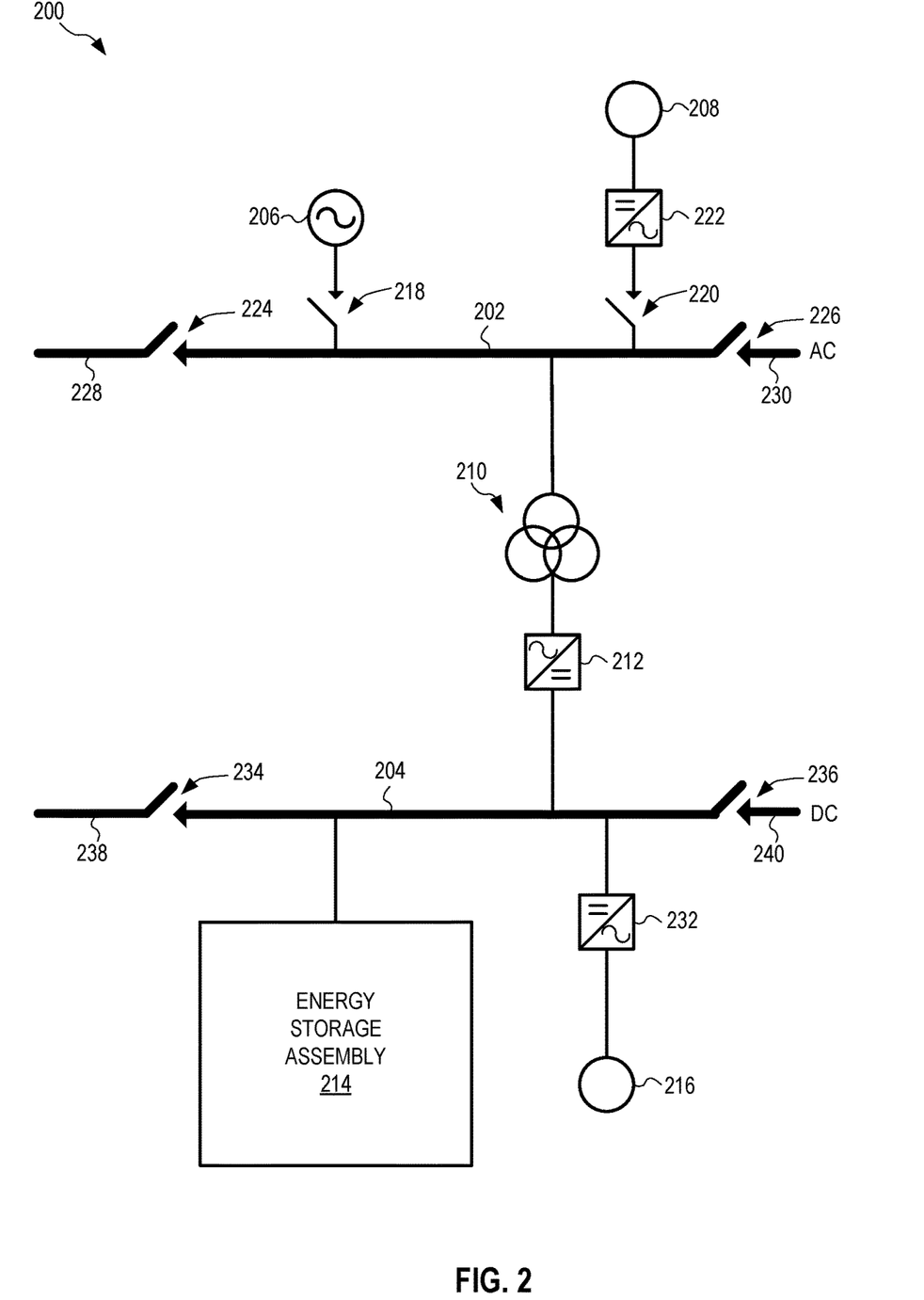
FIG. 2 illustrates an electric power system, according to an embodiment.
Figure 3:
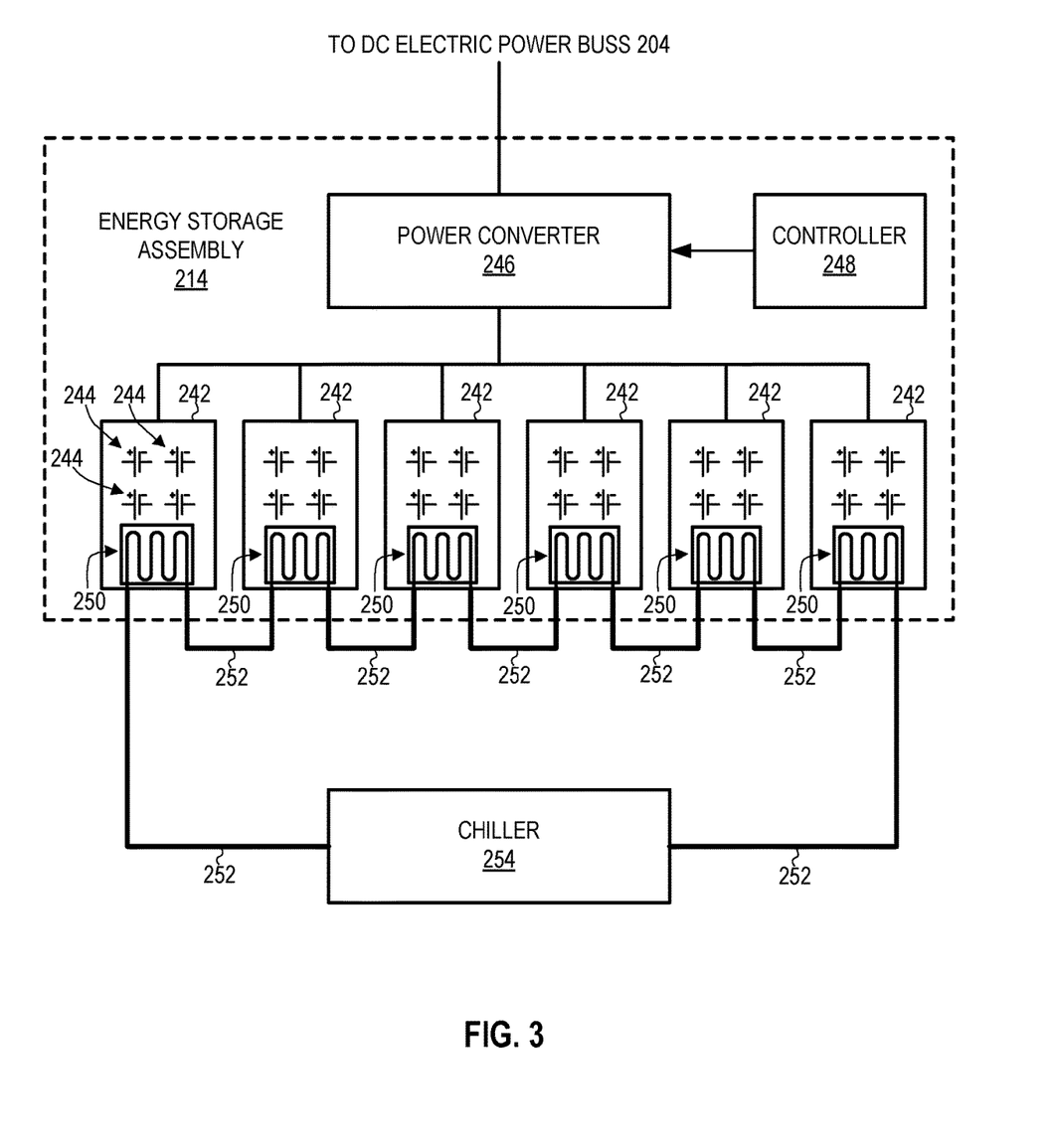
FIG. 3 illustrates an energy storage assembly of the FIG. 2 electric power system.

FIG. 2 illustrates an electric power system 200 including an AC electric power buss 202, a direct current (DC) electric power buss 204, a combustion generator 206, an AC buss load 208, a transformer 210, a power converter 212, an energy storage assembly 214, and a DC buss load 216. FIG. 3 illustrates energy storage assembly 214 in greater detail. Possible applications of electric power system 200 include, but are not limited to, drilling rig applications and ship applications.

Transformer 210 and power converter 212 collectively electrically couple AC electric power buss 202 and DC electric power bus 204. Power converter 212 and transformer 210 are each capable of bidirectional power flow. In some embodiments, power converter 212 is implemented with multiple unidirectional power converters, such as a first power converter capable of transferring electric power from AC electric power buss 202 to DC electric power buss 204, and a second power converter capable of transferring electric power from DC electric power buss 204 to AC electric power buss 202. Transformer 210 and/or power converter 212 could be replaced with other electrical equipment capable of electrically coupling AC electric power buss 202 with DC electric power buss 204 without departing from the scope hereof.

Combustion generator 206 is electrically coupled to AC electric power buss 202 via a circuit breaker 218. In certain embodiments, combustion generator 206 is a synchronous, three-phase generator driven by a combustion engine, such as a diesel engine, for powering loads of electric power system 200. Combustion generator 206 is, for example, configured to generate a voltage ranging from 5 kilovolts (kV) to 15 kV on electric power buss 202. Combustion generator 206 is typically controlled by a control subsystem (not shown) to maintain a desired voltage and frequency on AC electric power buss 202. Electric power system 200 may include additional combustion generator 206 instances electrically coupled to AC electric power buss 202 without departing from the scope hereof.

AC buss load 208 is electrically coupled to AC electric power buss 202 by a circuit breaker 220 and, optionally, a power converter 222. Power converter 222, when included in electric power system 200, transforms the voltage and frequency of AC electric power buss 202 to a form that is suitable for AC buss load 208. Although power converter 222 is illustrated as being an AC-to-DC converter, power converter 222 could take other forms, such as an AC-to-AC converter, without departing from the scope hereof. In some embodiments, AC buss load 208 is a drawwork, a winch, a HPU, an electric thruster, a mud pump, a top drive, a rotary table, a dynamic braking system, or a drilling rig peripheral electrical load. In some cases, AC buss load 208 may be negative, such as where AC buss load 208 includes an electric motor operating in a regenerative breaking mode. Although electric power system 200 is illustrated with only a single AC buss load 208 for simplicity, electric power system 200 may, and typically will, include additional AC bus load 208 instances electrically coupled to AC electric buss 202 via respective circuit breakers 220 and optional respective power converters 222. Additionally, in embodiments including additional AC bus load 208 instances, each AC bus load 208 instance need not necessarily be of the same type of load. AC electric power buss 202 is optionally electrically coupled to adjacent AC electric power busses 228 and 230 via respective buss-tie circuit breakers 224 and 226, such that AC electric power buss 202 is one segment of a multi-segment AC electric power buss.

Optionally, DC buss load 216 is electrically coupled to DC electric power buss 204 via a power converter 232. Power converter 232 transforms DC voltage on DC electric power bus 204 to a voltage and frequency compatible with DC buss load 216. For example, in embodiments where DC buss load 216 requires an AC voltage, power converter 226 may be an inverter, and in embodiments where DC buss load 216 requires a DC voltage, power converter 226 may be a DC-to-DC converter. In some embodiments, DC buss load 216 is a drawwork, a winch, a HPU, an electric thruster, a mud pump, a top drive, a rotary table, a dynamic braking system, or a drilling rig peripheral electrical load. In some cases, DC buss load 216 may be negative, such as in cases where DC buss load 216 includes an electric motor operating in a regenerative breaking mode. While electric power system 200 is illustrated with only a single DC buss load 216 instance for simplicity, electric power system 200 may, and typically will, include additional DC buss load 216 instances electrically coupled to DC electric buss 204. Additionally, in embodiments including additional DC buss load 216 instances, each DC buss load 216 instance need not necessarily be of the same type of load. For example, one DC buss load 216 instance may be a lifting device while another DC buss load 216 instance may be a mud pump motor. DC electric power buss 204 is optionally electrically coupled to adjacent DC electric power busses 238 and 240 via respective buss-tie circuit breakers 234 and 236, such that DC electric power buss 204 is one segment of a multi-segment DC electric power buss.

Figure 10:
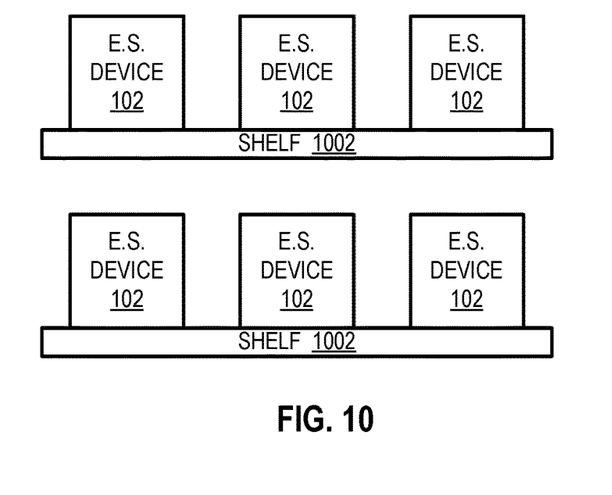
FIG. 10 illustrates a plurality of fire-resistant energy storage devices disposed on shelves, according to an embodiment.
Figure 11:
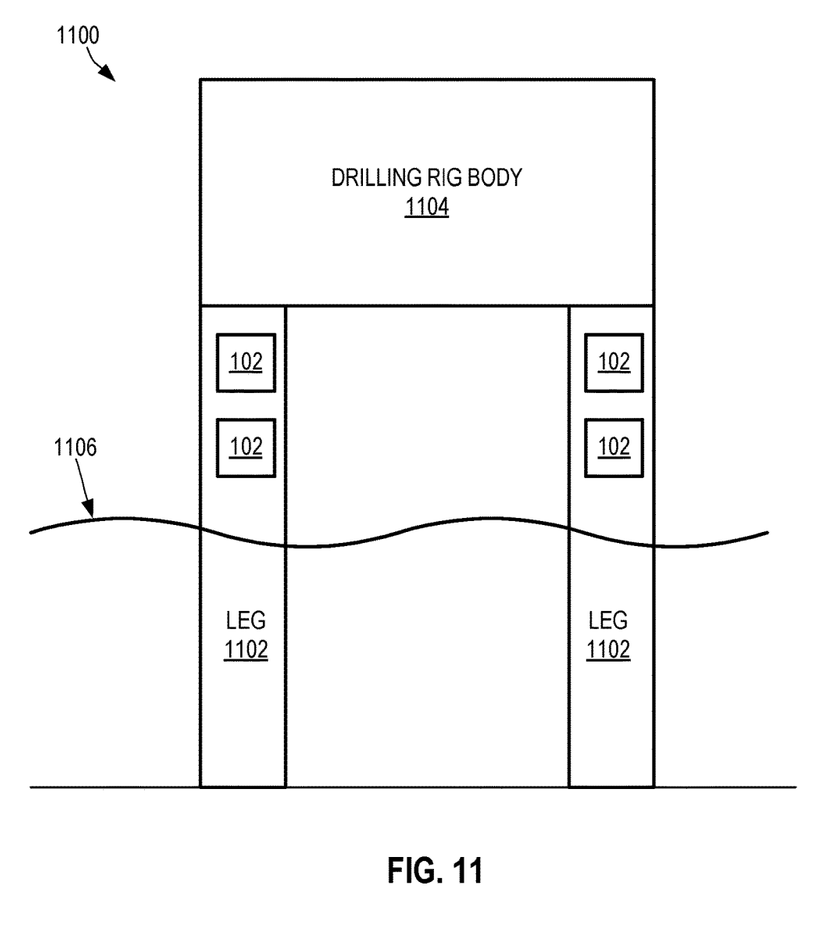
FIG. 11 illustrates a plurality of fire-resistant energy storage devices disposed in legs of a semi-submersible drilling rig, according to an embodiment.

Energy storage assembly 214 includes a plurality of physical separate fire-resistant energy storage devices 242 (see FIG. 3) and at least one power converter 246 configured to electrically interface the plurality of physically separate fire-resistant energy storage devices 242 with DC electric power buss 204. In some embodiments, each fire-resistant energy storage device 242 has a physical form factor equivalent to that of an industry-standard energy storage device, such as an industry-standard battery form factor or an industry standard flywheel form factor. For example, in particular embodiments, each energy storage device 242 has a fire-resistant chassis which occupies a volume of 5 m$^3$ or less, such as 4.5 m$^3$ or less, 4 m$^3$ or less, 3.5 m$^3$ or less, 3 m$^3$ or less, 2.5 m$^3$ or less, 2 m$^3$ or less, 1.5 m$^3$ or less, 1 m$^3$ or less, or 0.5 m$^3$ or less. In some embodiments, each fire-resistant energy storage device 242 is disposed on one or more shelves 1002, such as illustrated in FIG. 10. In some other embodiments, each fire-resistant energy storage device 242 is disposed in a column or "leg" 1102 supporting a body 1104 of a semi-submersible drilling rig 1100, preferable above a water level 1106, such as illustrated in FIG. 11, to protect the energy storage devices from damage in event of an explosion in body 1104.

Each fire-resistant energy storage device 242 includes a plurality of energy storage elements 244. In some embodiments where each energy storage element 244 has a relatively large energy storage capacity, each fire-resistant energy storage device 242 includes relatively few energy storage elements 244, such as no more than three energy storage elements 244. Only several instances of energy storage elements 244 are labeled in FIG. 3 to promote illustrative clarity. Fire-resistant energy storage devices 242 are optionally electrically coupled together, such as in series and/or in parallel. Each energy storage element 244 is, for example, a battery, such as a Lithium-ion battery, a flywheel, or a super capacitor, or a combination thereof. In cases where each energy storage elements are batteries, each battery includes, for example, a plurality of electro-chemical cells electrically coupled in series and/or parallel to provide power to a common power outlet of the battery. Each fire-resistant energy storage device 242 is configured to store energy, such as energy provided by combustion generator 206 and/or energy provided by regenerative braking of AC buss load 208 and/or DC buss load 216, as well as to deliver energy stored therein to AC buss load 208 and/or DC buss load 216. Energy storage assembly 214 optionally further includes a controller 248 for controlling power converter 246, and optionally for further controlling fire-resistant energy storage devices 242, to control flow of electric power between fire-resistant energy storage devices 242 and DC electric power buss 204. In some embodiments, controller 248 is configured to control such power flow so that physically separate fire-resistant energy storage devices 242 collectively act as a single energy storage device electrically coupled to the DC electric power buss 204.

Each fire-resistant energy storage device 242 is resistant to a fire external to the energy storage device, or in other words, each fire-resistant energy storage device 242 is capable of protecting its constituent energy storage elements 244 from a fire external to the energy storage device. For example, in some embodiments, each fire-resistant energy storage device 242 complies with IMO Class A-60 standard with respect to a fire external to the energy storage device. The fire resistance of fire-resistant energy storage devices 242 may advantageously enable electric power system 200 to meet applicable safety and reliability requirements without requiring a fire-resistant cabinet or room to house energy storage devices 242. For example, in some embodiments, fire-resistant energy storage devices 242 are disposed outside of a fire-resistant enclosure. Consequently, electric power system 200 may be smaller, less expensive, and/or easier to access than a conventional electric power system including energy storage devices housed in a fire-resistant cabinet or room.

In some embodiments, each fire-resistant energy storage device 242 further includes a respective heat exchanger 250 capable of performing two functions, i.e., (a) to cool constituent energy storage elements 244 of the energy storage device and (b) to absorb heat from a fire external to the energy storage device 242 and thereby protect constituent energy storage elements 244 of energy storage device 242 from the fire. In some embodiments, each heat exchanger 250 partially or completely surrounds the energy storage elements 244 of its respective fire-resistant energy storage device 242, to promote cooling of energy storage elements 244 and protection of energy storage elements 244 from an external fire. In particular embodiments, each heat exchanger 250 is liquid-cooled such that a liquid, for example water, circulates through the heat exchanger to transfer heat from the heat exchanger to the liquid. In these embodiments, piping 252 circulates liquid between heat exchangers 250 and a chiller 254, and chiller 254 removes heat from the liquid. Chiller 254 includes, for example, a mechanical refrigeration system to remove heat from the liquid.

In particular embodiments, fire-resistant energy storage devices 242 collectively have a large energy storage capacity and are capable of quickly responding to a change in load. Fire-resistant energy storage devices 242 are also capable of storing and delivering energy at a high rate, in some embodiments. For example, in particular embodiments, fire-resistant energy storage devices 242 (a) are capable of responding to a change in load within ten milliseconds, or within one millisecond in some embodiments, (b) collectively have an energy storage capacity of at least 100 kilowatt hours (kWh), and (c) collectively have a maximum peak power output of at least one megawatt (MW). Additionally, in some embodiments, fire-resistant energy storage devices 242 collectively have an energy storage capacity of at least one megawatt hour (MWh) and are capable of providing an output power of at least 1 MW for five or more minutes. Additionally, in certain embodiments, fire-resistant energy storage devices 242 collectively have a maximum power output that is at least as great as that of any one combustion generator 206 instance, such as 4-10 MW.

In some embodiments, fire-resistant energy storage devices 242 are capable of performing peak shaving, i.e., to supplement combustion generator 206 in meeting peak demands of AC buss load 208 and/or DC buss load 216. Such peak shaving capability of fire-resistant energy storage devices 242 may reduce the need for combustion generator spinning reserve, thereby potentially enabling the size of combustion generator 206 to be reduced and/or enabling a reduction in number of operating combustion generator 206 instances. Alternately or additionally, in some embodiments, fire-resistant energy storage devices 242 are capable of providing backup power to AC buss load 208 and/or DC buss load 216 in the event combustion generator 206 is unable to power these loads, thereby reducing possibility of a blackout. For example, in some embodiments, AC buss load 208 and/or DC buss load 216 include one or more electric thruster instances, and fire-resistant energy storage devices 242 are capable of powering the electric thrusters in case combustion generator 206 is unable to power the electric thruster instances. Furthermore, in some embodiments, fire-resistant energy storage devices 242 are capable of storing energy providing by a regenerative braking component of AC buss load 208 and/or DC buss load 216.

Figure 4:
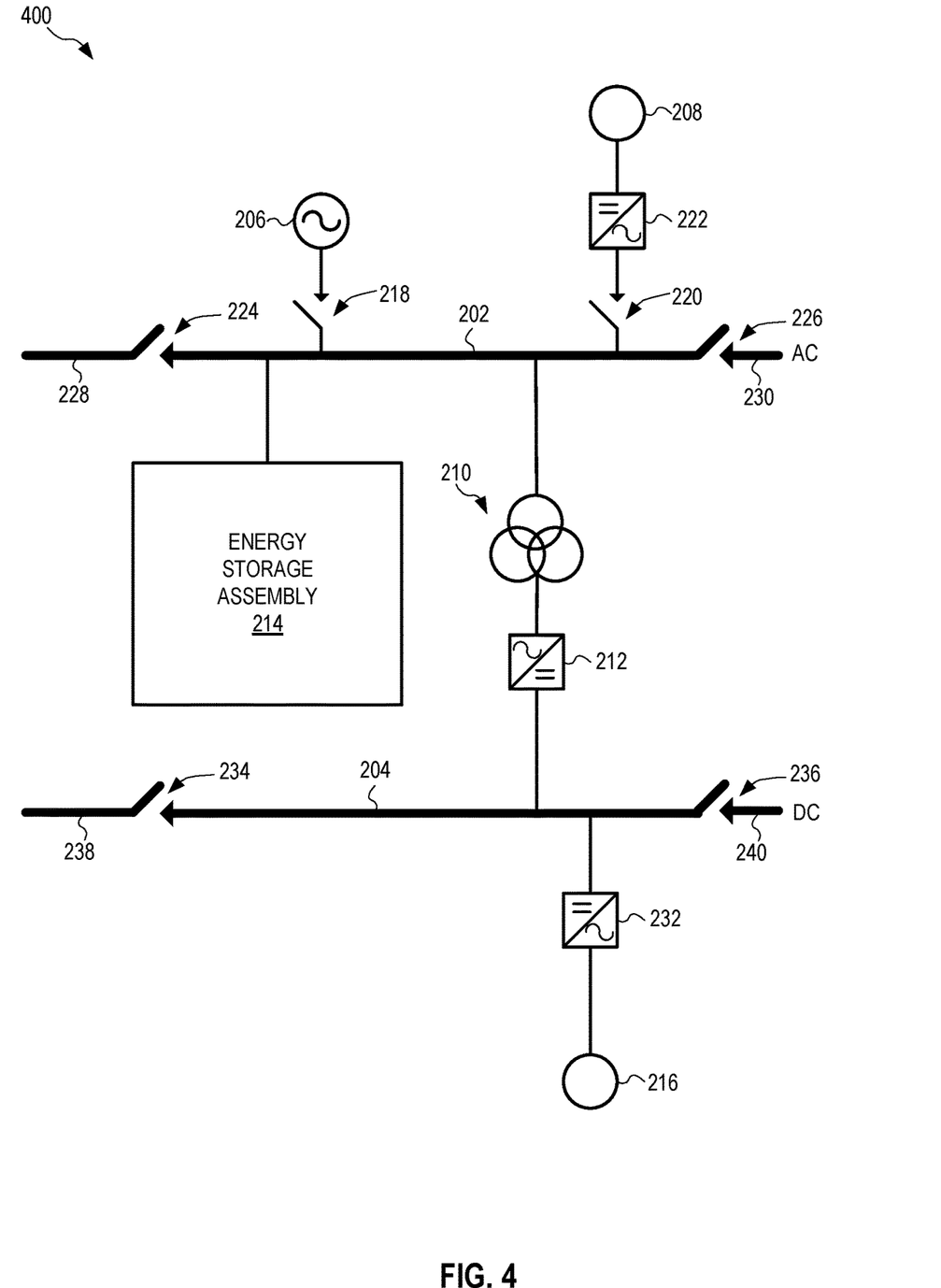
FIG. 4 illustrates an electric power system like the FIG. 2 electric power system but where an energy storage assembly is electrically coupled to an AC electric power buss instead of to a DC electric power buss, according to an embodiment.
Figure 5:
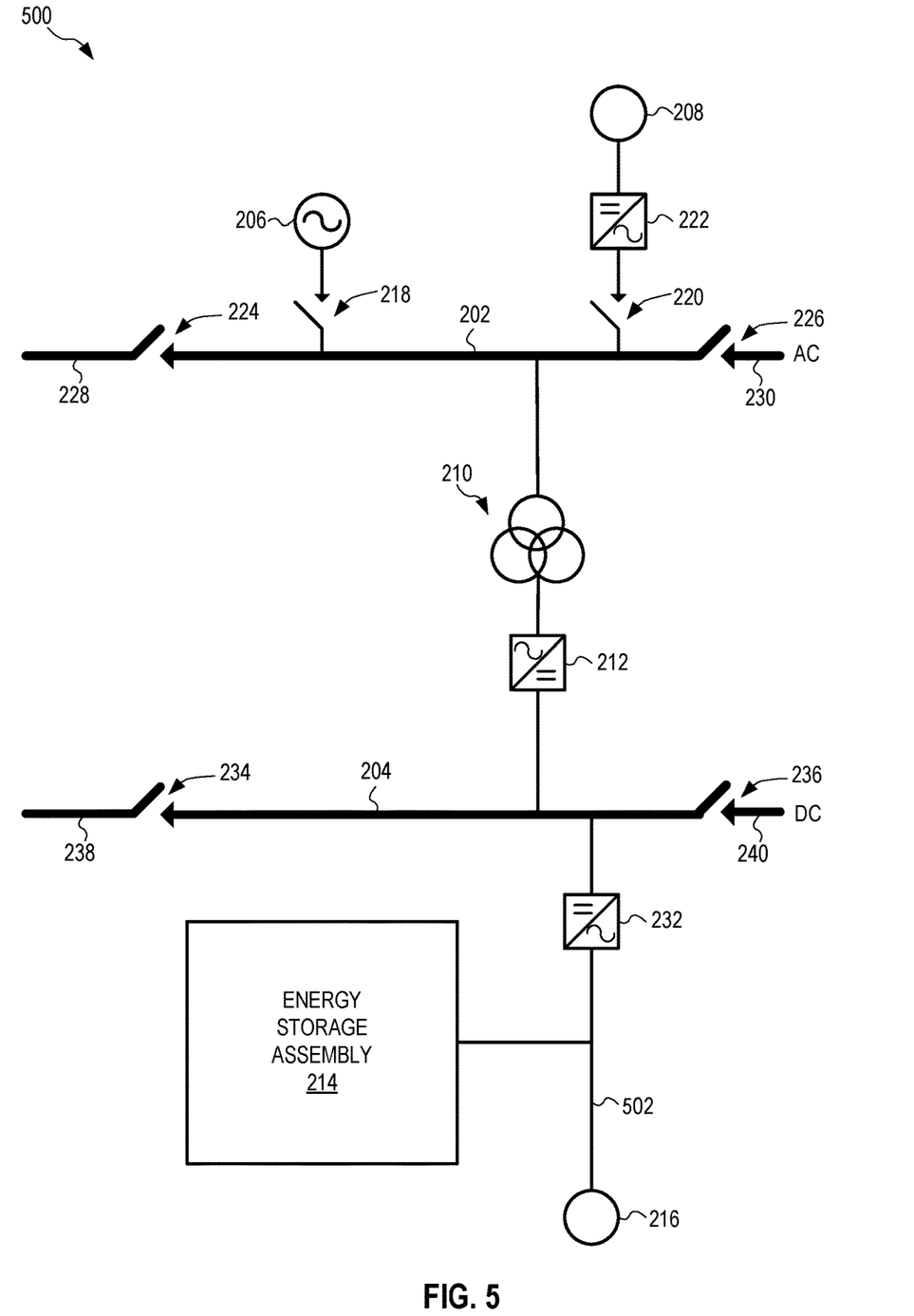
FIG. 5 illustrates an electric power system which is like the FIG. 2 electric power system but where an energy storage assembly is electrically coupled to a second AC electric power buss, according to an embodiment.

The configuration of electric power system 200 may be modified without departing from the scope hereof. For example, the number and/or type of electric power busses may be varied, and the number and type of loads may be varied, without departing from the scope hereof. Additionally, energy storage assembly 214 may be coupled to a different electric buss. For example, FIGS. 4 and 5 illustrate respective examples of possible alternate embodiments of electric power system 200. In particular, FIG. 4 illustrates an electric power system 400, which is like electric power system 200 but where energy storage assembly 214 is electrically coupled to AC electric power buss 202 instead of to DC electric power buss 204. FIG. 5, in turn, illustrates an electric power system 500, which is like electric power system 200 but where energy storage assembly 214 is electrically coupled to second AC electric power buss 202 electrically coupling DC buss load 216 to power converter 232. It should be appreciated, however, that energy storage assembly 214 is not limited to use in the electric power systems of FIGS. 2, 3, and 5.

FIGS. 6-9 illustrate a fire-resistant energy storage device 600, which is one possible embodiment of fire-resistant energy storage device 242. It should be appreciated, however, that fire-resistant energy storage devices 242 are not limited to the embodiment of FIGS. 6-9. Additionally, the fire-resistant energy storage devices of FIGS. 6-9 are not limited to use in the electric power systems of FIGS. 2, 4, and 5.

Figure 6:
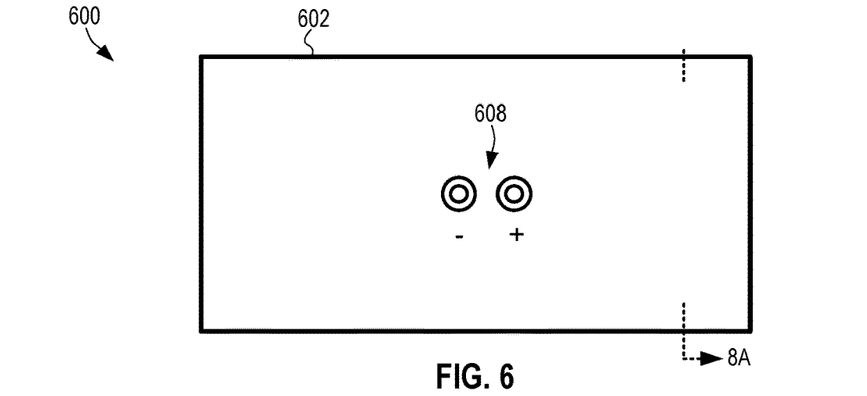
FIG. 6 is a top plan view of a fire-resistant energy storage device, according to an embodiment.
Figure 7:
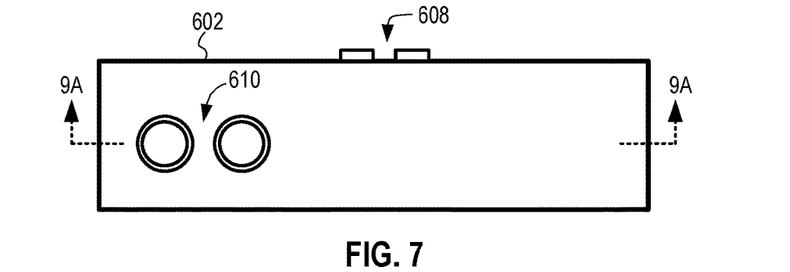
FIG. 7 is a side elevational view of the FIG. 6 fire-resistant energy storage device.
Figure 8:
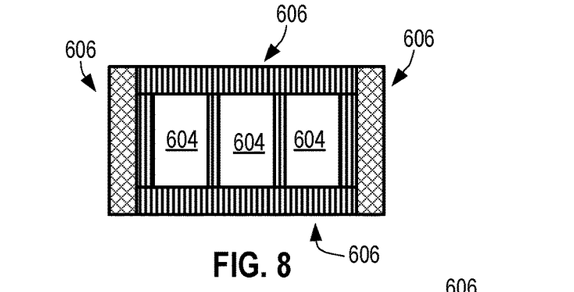
FIG. 8 is a cross-sectional view of the FIG. 6 fire-resistant energy storage device.
Figure 9:
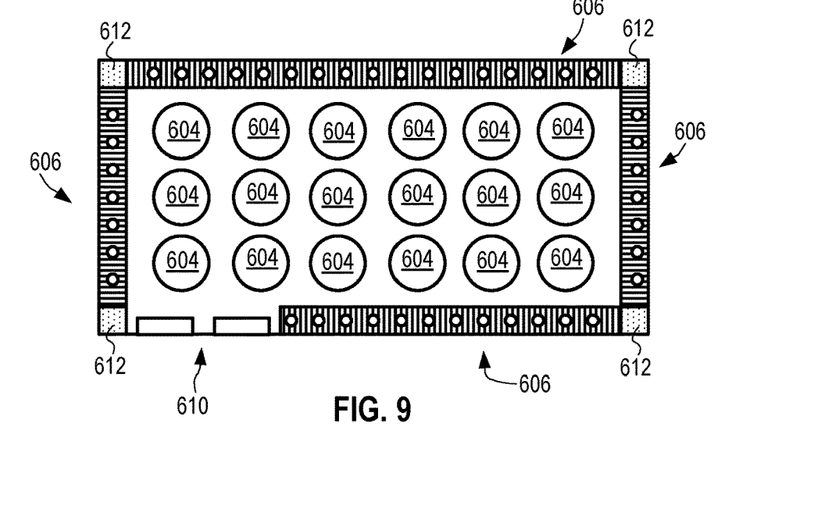
FIG. 9 is another cross-sectional view of the FIG. 6 fire-resistant energy storage device.
Figures 12, 13:
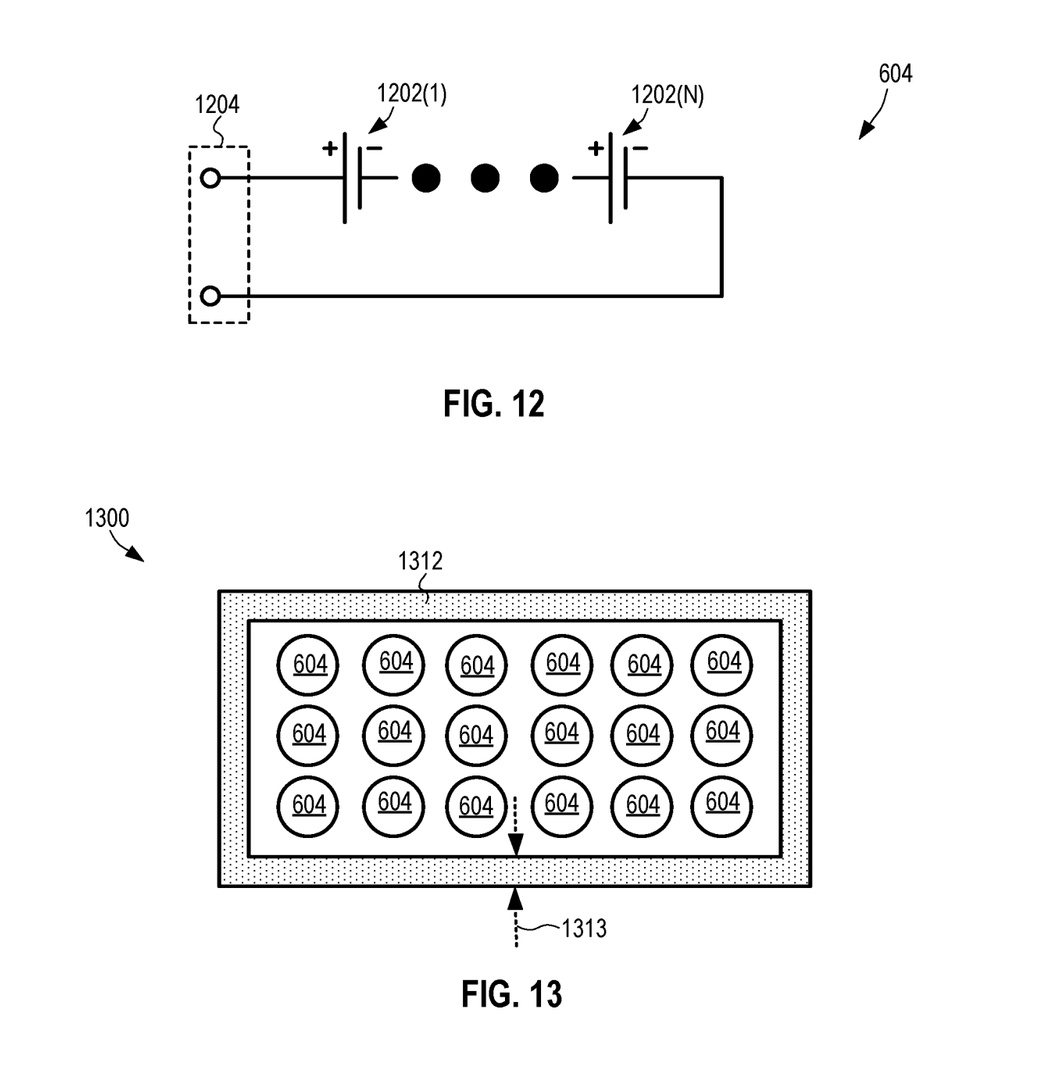
FIG. 12 illustrates a battery including a plurality of electrochemical cells electrically coupled in series to power a common power outlet, according to an embodiment.
FIG. 13 is a cross-sectional view analogous to that of FIG. 9 of a fire-resistant energy storage device including thermally insulating material, according to an embodiment.

FIG. 6 is a top plan view of a fire-resistant energy storage device 600, FIG. 7 is a side elevational view of fire-resistant energy storage device 600, FIG. 8 is a cross-sectional view of fire-resistant energy storage device 600 taken along line 8A-8A of FIG. 6, and FIG. 9 is a cross-sectional view of fire-resistant energy storage device 600 taken along line 9A-9A of FIG. 7. Fire-resistant energy storage device 600 includes a fire-resistant chassis 602, a plurality of energy storage elements in the form of batteries 604 housed in fire-resistant chassis 602, a heat exchanger 606, electrical terminals 608, and cooling liquid terminals 610. Fire-resistant chassis 602 is, for example, configured for placement in a battery housing assembly, such as a rack or shelf for housing one or more rows batteries in a room. In some embodiments, fire-resistant energy storage device 600 has a physical form factor equivalent to that an industry-standard battery, such that fire-resistant energy storage device 600 is capable of being placed a battery housing assembly configured to house one or more industry-standard batteries. Each battery 604 includes one or more electro-chemical cells electrically coupled in series and/or parallel. For example, FIG. 12 illustrates one embodiment of a battery 604 instance including N electrochemical cells 1202 electrically coupled in series to power a common power outlet 1204, where N is an integer greater than one. In some embodiments, fire-resistant chassis 602 is a first enclosure surrounding electrochemical cells 1202. The number and type of batteries 604 housed in fire-resistant chassis 602 may vary without departing from the scope hereof. Electrical terminals 608 are electrically coupled to batteries 604 by electrical conductors (not shown), and cooling liquid terminals 610 are in fluid communication with heat exchanger 606 by piping (not shown). Batteries 604 are electrically coupled together in series, in parallel, or in a series-parallel manner. The configuration and location of electrical terminals 608 and cooling liquid terminals 610 may vary without departing from the scope hereof.

Heat exchanger 606 performs dual functions. First, heat exchanger 606 cools batteries 604 by transferring heat from batteries 604 to a liquid flowing through heat exchanger 606. Second, heat exchanger 606 protects batteries 604 from a fire external to fire-resistant energy storage device 600 by transferring heat from the fire to the liquid flowing through heat exchanger 606, thereby helping prevent heat from the fire from reaching batteries 604. Heat exchanger 606 substantially surrounds batteries 604, and a thermally insulating material 612 helps prevent heat from a fire from reaching batteries 604 through portions of fire-resistant energy storage device 600 not including heat exchanger 606. In some embodiments, fire-resistant energy storage device 600 complies with IMO Class A-60 standard with respect to a fire external to the energy storage device.

In some other embodiments, the fire-resistant energy storage devices do not include a heat exchanger and instead rely on thermal insulation partially or completely surrounding constituent energy storage elements to protect the energy storage elements from a fire external to the energy storage device. For example, FIG. 13 is a cross-sectional view analogous to that of FIG. 9 of a fire-resistant energy storage device 1300. Fire-resistant energy storage device 1300 is similar to fire-resistant energy storage device 600 but includes thermally insulating material 1312 in place of heat exchanger 606. In certain embodiments, thermally insulating material 1312 has a thickness 1313 of 300 mm or less, 200 mm or less, 100 mm or less, or 50 mm or less.

Changes may be made in the above devices, systems, and methods without departing from the scope hereof. For example, the configuration of heat exchanger 606 of fire-resistant energy storage device 600 may be varied without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present devices, systems, and methods, which, as a matter of language, might be said to fall therebetween.

The invention claimed is:

1. A fire-resistant energy storage device, comprising:
a fire-resistant chassis; and
one or more energy storage elements comprising at least one battery housed in the chassis; a heat exchanger surrounding the one or more energy storage elements and configured to (a) cool the one or more energy storage elements and (b) protect the one or more energy storage elements from a fire external to the fire-resistant energy storage device.

2. The fire-resistant energy storage device of claim 1, wherein each of the one or more energy storage elements comprises a battery or is a battery.

3. The fire-resistant energy storage device of claim 1, wherein each battery comprises one or more electro-chemical cells, and the fire-resistant chassis is a first enclosure surrounding the one or more electro-chemical cells of each battery.

4. The fire-resistant energy storage device of claim 1, wherein said fire-resistant chassis occupies a volume of 5 $m^3$ or less, 4.5 $m^3$ or less, 4 $m^3$ or less, 3.5 $m^3$ or less, 3 $m^3$ or less, 2.5 $m^3$ or less, 2 $m^3$ or less, 1.5 $m^3$ or less, 1 $m^3$ or less, 0.5 $m^3$.

5. The fire-resistant energy storage device of claim 1, wherein said fire-resistant chassis occupies a volume of 4 $m^3$ or less, 3.5 $m^3$ or less, 3 $m^3$ or less, 2.5 $m^3$ or less, 2 $m^3$ or less, 1.5 $m^3$ or less, 1 $m^3$ or less, 0.5 $m^3$.

6. The fire-resistant energy storage device claim 1 the one or more energy storage elements comprising a flywheel.

7. The fire-resistant energy storage device of claim 1, the heat exchanger being a liquid-cooled heat exchanger.

8. The fire-resistant energy storage device of claim 1, the heat exchanger at least partially surrounding the one or more energy storage elements.

9. The fire-resistant energy storage device of claim 8, the heat exchanger fully surrounding the one or more energy storage elements.

10. The fire-resistant energy storage device of claim 1, the fire-resistant energy storage device complying with International Maritime Organization Class A-60 standard with respect to protecting the fire-resistant energy storage device from a fire external to the fire-resistant energy storage device.

11. The fire-resistant energy storage device of claim 1, further comprising thermally insulating material to protect the one or more energy storage elements from a fire external to the energy storage device.

12. The fire-resistant energy storage device of claim 11, the thermally insulating material having a thickness of 300 mm or less, 200 mm or less, 100 mm or less, or 50 mm or less.

13. The fire-resistant energy storage device of claim 1, the fire-resistant chassis being configured for placement in a battery housing assembly.

14. The fire-resistant energy storage device of claim 1, the fire-resistant energy storage device having a physical form factor equivalent to that of an industry-standard battery.

15. The fire-resistant energy storage device of claim 2, each battery being a lithium-ion battery.

16. An energy storage assembly, comprising:
a plurality of physically separate fire-resistant energy storage devices each according to claim 1, each of the plurality of physically separate fire-resistant energy storage devices being configured to protect one or more energy storage elements of the fire-resistant energy storage device from a fire external to the fire-resistant energy storage device; and
at least one power converter configured to electrically interface the plurality of physically separate fire-resistant energy storage devices with an electric power bus.

17. The energy storage assembly of claim 15, wherein each of a plurality of physically separate fire-resistant energy storage devices being electrically coupled together.

18. The energy storage assembly of claim 15, each of a plurality of physically separate fire-resistant energy storage devices housing no more than three energy storage elements.

19. A fire-resistant energy storage device, comprising:
a fire-resistant chassis;
one or more energy storage elements comprising at least one battery housed in the chassis; and
a liquid-cooled heat exchanger inside the fire-resistant chassis and surrounding the one or more energy storage elements, the liquid-cooled heat exchanger configured to:
  (a) cool the one or more energy storage elements by transferring heat from the one or more energy storage elements to a liquid circulating through the heat exchanger; and
  (b) protect the one or more energy storage elements from a fire external to the fire-resistant energy storage device by transferring heat from the first to the liquid circulating through the heat exchanger.

* * * * *